Jan. 26, 1960 K. C. SCHURR 2,922,358
SKEWER
Filed March 13, 1957
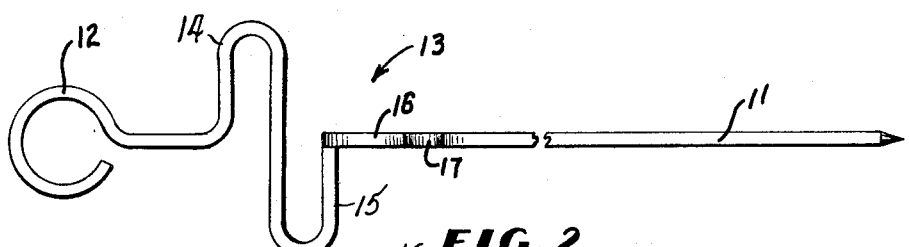
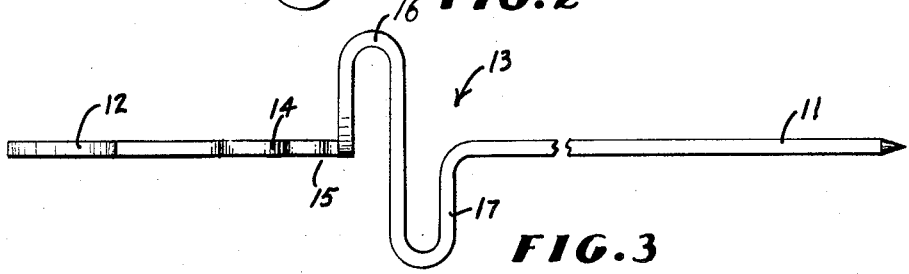
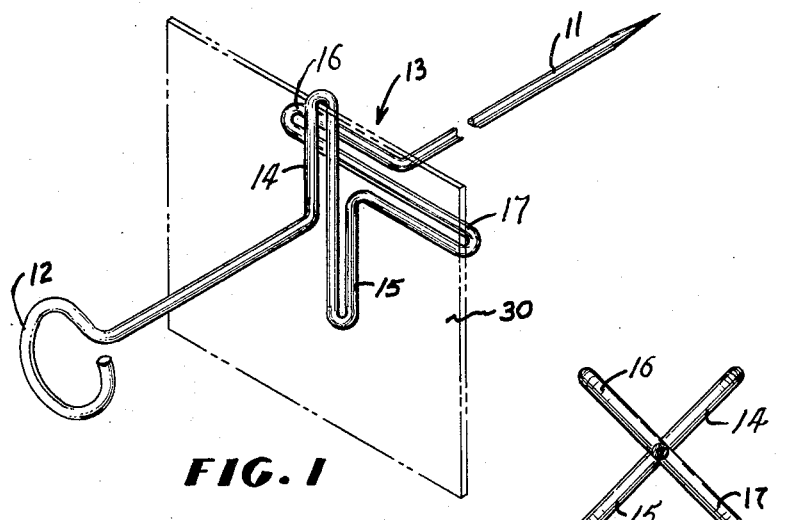
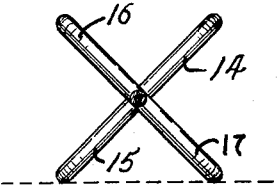
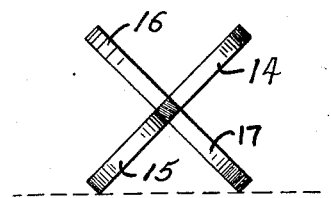
INVENTOR.
KENNETH C. SCHURR
BY
-ATTORNEYS

United States Patent Office 2,922,358
Patented Jan. 26, 1960

2,922,358
SKEWER

Kenneth C. Schurr, Grand Rapids, Mich.

Application March 13, 1957, Serial No. 645,750

2 Claims. (Cl. 99—419)

This invention relates to a skewer and more particularly to a skewer designed for kabob cooking.

Various types of skewers have been designed for cooking kabob and other food over an open fire. Kabob generally consists of small pieces of meat frequently mixed with vegetables that are all inserted on a stick or skewer. The cubes of meat are usually cut into squares. It is important that the kabob be evenly cooked on all four sides. An object of this invention is to provide a skewer that holds the kabob in the desired position at all times for even cooking.

Another object of this invention is to provide a skewer designed to prevent the kabob from turning on the rod and prevent the rod itself from turning.

Still another object of this invention is to provide a skewer designed to accommodate about every type of grill and also adapted to be used on make-shift grills such as two parallel logs or stones.

Another object of this invention is to provide a skewer entirely constructed of metal and designed to keep the handle cool and comfortable at all times.

Still another object of this invention is to provide a skewer that is easy to manufacture since it is constructed of a one piece metal rod.

Other objects of this invention will become obvious upon reading the following specification in conjunction with the accompanying drawings wherein:

Fig. 1 is a side elevational oblique view of the skewer.

Fig. 2 is a side elevational view of a skewer having a square cross-section.

Fig. 3 is another side elevational view of the skewer.

Fig. 4 is an end view of the skewer of Fig. 1.

Fig. 5 is an end view of the skewer of Figs. 2 and 3.

Briefly this invention is concerned with a skewer designed for cooking kabob or other food. It consists of a single rod constructed of non-combustible material, preferably metal, and having a straight portion for receiving the food to be cooked. The rod near its handle has a portion bent into a plurality of successive bends arranged to protrude in different directions from the straight portion. These bends are preferably U-shaped and extend radially in different directions. The U-shaped bends have two substantially parallel sides connected together by a web. The sides are spaced to receive a support therebetween to prevent the skewer from turning. Thus the bends can receive the edge of a grill or broiler pan which positively prevents the skewer rods from turning.

The bends are arranged so that at least two different ones are located essentially on different planes whereby ends of two of the bends form legs that rest on a support surface to prevent the skewer from turning. Thus the skewer is prevented from turning by either resting the bends on a flat surface or inserting one of the bends over the edge of a support member.

Referring to the drawings, reference numeral 10 designates the skewer which includes a rod having a straight portion 11 and a bent handle 12. The rod 10 has a portion 13 successively bent into a plurality of generally U-shaped bends 14, 15, 16 and 17.

Each of the U-shaped bends have two substantially parallel sides 20 connected together by the web 21. The sides are spaced one from the other to receive a support member designated by reference numeral 30 (Fig. 1). This support 30 can be the edge of a grill, pan, or just a single piece of flat material.

All of the bends 14, 15, 16 and 17 are on a common plane with the straight portion 11. They thus protrude radially outwardly in different directions from the straight portion 11 as illustrated by Figs. 4 and 5. As shown, the bends 14 and 16 lie on one plane and 15 and 17 on another plane. These planes are arranged so that the ends of two adjacent bends form support legs to prevent the skewer from turning.

The rod 10 is constructed of round or square stock of stainless steel. Square stock is preferred because the kabob is then prevented from turning on the rod. The skewer is fabricated from a single piece of stainless steel rod. The bends 14, 15, 16 and 17 and the handle 12 are fabricated by any suitable bending apparatus. This bending can be done when the rod is either cold or hot. The pointed end is shaped by grinding or other suitable manner.

Operation

The operation of this skewer is very simple. The meat or other food is first inserted on the straight end 11. Then the skewer is held over hot coals either on a prefabricated grill or a make-shift grill such as two large stones or logs. On many types of grills a straight upstanding edge provides a support for one end of the skewer and the pointed end rests on another. In these types of grills one of the U-shaped bends is inserted over the upstanding edge and the skewer is thus prevented from turning. After the food has cooked or baked for some time, the skewer is turned one quarter of a turn and the next adjacent U-shaped bend is inserted over the support edge. This holds the skewer in the next quarter turn position. This is repeated for the one-half turn and three quarter turn positions resulting in an even cooking on all four sides.

For cooking hot dogs or other similar type meat, it is sometimes possible to insert a small board in one of the U-shaped bends and rest the straight portion on a log so that the meat is held over the hot coals. In such cases, the rectangular board is changed from one U-shaped bend to the other so that the meat is evenly cooked on all sides.

Within the broadest aspect of this invention the end of the skewer possibly consists of implements for holding hamburgs or steaks. In such a modification, the U-shaped turn provided at the end near the handle would serve the same purpose of positioning the steak or hamburg over the coals. Accordingly, in the broadest aspect of this invention the skewer can be any type of meat holder and it does not necessarily have to be used in cooking kabobs.

Frequently a skewer is laid between two members located on each side of the hot coal. This skewer adapts itself very well with such equipment. The U-shaped bends projecting from the straight portion provides legs that rest upon the flat surface of the support and prevent the skewer from turning. In accordance with this invention, the legs are arranged so that the skewer is turned a quarter of a turn as it is rotated from one leg to the next. Fig. 4 illustrates this principle in which it will be seen that legs formed by the U-shaped bends 16 and 17 prevent the skewer from turning. When rotated clockwise one-quarter of a turn the U-shaped bends 14 and 17 provide the leg supports. Bends 14 and 15 provide the leg supports when rotated one-half of a turn and legs 15 and 16 provide the support when rotated three-quarters of a turn.

It should be realized that more or less bends can be provided and at different angles.

It should be evident from the above description that I have provided a food holder for cooking food on open fire that is less expensive to manufacture than other type holders. It is easy to manipulate, allows for an even cooking on all sides, and will accommodate any type of grill or make-shift grill.

This skewer does not require any separate handle to be made from insulating materials such as wood or plastic. The bends dissipate the heat before it reaches the metal handle and thus maintain it cool and comfortable at all times.

It should be understood that although I have disclosed the preferred embodiments, other embodiments, alterations, and modifications are possible within the broadest aspect of this invention. Therefore, all of these embodiments, modifications and alterations should be considered covered by this invention unless the appended claims expressly state otherwise.

I claim:

1. A food holder for cooking food over an open fire comprising a single piece of non-combustible rod having means at one end for receiving food to be cooked and a handle at the other end, the improvement comprising: said rod being formed between the two ends into a straight portion for supporting the food and a bent portion between the handle and the straight portion for establishing the angular position of the food relative to the fire; said bent portion including at least three successive U-shaped bends extending radially from the line of said straight portion and in different directions; said bends forming support legs located on planes intersecting one another substantially on the line of said straight portion whereby after positioning said holder by turning of said holder about the axis through said straight portion the holder is prevented from turning by supporting it on a selected two of said support legs.

2. The food holder of claim 1 in which the U-shaped bends include two sides extending radially from said straight portion and connected at their ends by a web, said sides and web all lying on one of said intersecting planes whereby a support edge arranged substantially perpendicular to said straight portion can be received between said sides.

References Cited in the file of this patent

UNITED STATES PATENTS

| | | |
|---|---|---|
| 26,322 | Mitchell | Nov. 24, 1896 |
| 898,758 | Matheson | Sept. 15, 1908 |
| 2,458,239 | Bartlett | Jan. 4, 1949 |
| 2,563,159 | Clark | Aug. 7, 1951 |